United States Patent
Bruck et al.

(10) Patent No.: US 11,906,781 B2
(45) Date of Patent: Feb. 20, 2024

(54) END-FACE COUPLING STRUCTURES UNDERNEATH A PHOTONIC LAYER

(71) Applicant: Cisco Technology, Inc., San Jose, CA (US)

(72) Inventors: Roman Bruck, Vienna (AT); Gianlorenzo Masini, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/064,506

(22) Filed: Dec. 12, 2022

(65) Prior Publication Data

US 2023/0112848 A1 Apr. 13, 2023

Related U.S. Application Data

(62) Division of application No. 17/248,579, filed on Jan. 29, 2021, now Pat. No. 11,567,262.

(51) Int. Cl.
*G02B 6/136* (2006.01)
*G02B 6/125* (2006.01)

(52) U.S. Cl.
CPC ............ *G02B 6/136* (2013.01); *G02B 6/125* (2013.01)

(58) Field of Classification Search
CPC .... G02B 6/136; G02B 6/125; G02B 6/12004; G02B 6/305
See application file for complete search history.

(56) References Cited

U.S. PATENT DOCUMENTS

| | | | | |
|---|---|---|---|---|
| 7,817,882 B2 * | 10/2010 | Blauvlet | ............. | G02B 6/4204 438/31 |
| 9,638,859 B1 * | 5/2017 | Nuttall | ................ | G02B 6/4274 |
| 9,971,096 B2 * | 5/2018 | Shastri | ................ | G02B 6/30 |
| 9,995,881 B1 * | 6/2018 | Patel | ................... | G02B 6/4243 |
| 10,025,045 B2 * | 7/2018 | Nuttall | ................ | G02B 6/423 |
| 10,488,602 B2 * | 11/2019 | Evans | ................ | G02B 6/32 |
| 10,495,830 B2 * | 12/2019 | Nuttall | ................ | G02B 6/428 |
| 10,641,976 B2 * | 5/2020 | Wade | ................... | G02B 6/423 |
| 2009/0304326 A1 * | 12/2009 | Blauvelt | ............. | G02B 6/4204 438/31 |
| 2015/0010266 A1 * | 1/2015 | Webster | ................ | G02B 6/30 438/31 |
| 2016/0306110 A1 * | 10/2016 | Lambert | ............... | G02B 6/136 |
| 2017/0139142 A1 * | 5/2017 | Patel | ................. | G02B 6/12004 |
| 2017/0205594 A1 * | 7/2017 | Nuttall | ................ | G02B 6/30 |
| 2017/0261704 A1 * | 9/2017 | Doany | ................ | G02B 6/136 |
| 2017/0351031 A1 * | 12/2017 | Shastri | ................ | G02B 6/136 |
| 2018/0059331 A1 * | 3/2018 | Evans | ................ | G02B 6/30 |
| 2018/0239095 A1 * | 8/2018 | Wade | ................ | G02B 6/423 |
| 2018/0314017 A1 * | 11/2018 | Nuttall | ................ | G02B 6/4274 |

(Continued)

*Primary Examiner* — Andrew Jordan
(74) *Attorney, Agent, or Firm* — Patterson + Sheridan, LLP

(57) ABSTRACT

A method includes providing a photonic wafer that includes an electrical layer and a layer disposed on a substrate. The layer includes at least one optical waveguide that is disposed between the electrical layer and the substrate. The method also includes removing a portion of the substrate underneath the at least one optical waveguide and forming an end-face coupler. A portion of the end-face coupler is within the removed portion of the substrate. The end-face coupler transmits an optical signal to, or receives an optical signal from, an external optical device.

8 Claims, 8 Drawing Sheets

(56) References Cited

U.S. PATENT DOCUMENTS

| | | | |
|---|---|---|---|
| 2019/0146162 A1* | 5/2019 | Evans | G02B 6/4204 |
| | | | 385/89 |
| 2020/0057216 A1* | 2/2020 | Nuttall | G02B 6/4274 |
| 2020/0264390 A1* | 8/2020 | Wade | H01L 29/0649 |
| 2021/0132309 A1* | 5/2021 | Zhang | H05K 1/186 |
| 2022/0244459 A1* | 8/2022 | Bruck | G02B 6/305 |
| 2023/0112848 A1* | 4/2023 | Bruck | G02B 6/125 |
| | | | 385/14 |

* cited by examiner

END-FACE COUPLING STRUCTURES UNDERNEATH A PHOTONIC LAYER

CROSS-REFERENCE TO RELATED APPLICATIONS

This application is a divisional of co-pending U.S. patent application Ser. No. 17/248,579 filed Jan. 29, 2021. The aforementioned related patent application is herein incorporated by reference in its entirety.

TECHNICAL FIELD

Embodiments presented in this disclosure generally relate to optical communications. More specifically, embodiments disclosed herein relate to end-face coupling structures underneath a photonic layer.

BACKGROUND

Coupling light between optical fibers and integrated optical chips presents significant challenges. The diameter of the light profile in optical fibers is much larger than in integrated optical waveguides. The larger diameter beam cannot be routed through the chip as electrical layers in the chip would interfere with the light propagation. For example, some optical chips use end-face couplers positioned at an end facet of the chip to receive light into a waveguide within the chip. The coupler may include a spot size converter that transitions the light between the optical fiber and the waveguide. Conventionally, the spot size converter is positioned above the waveguide, in a space that is typically used by the electrical backend layers. The electrical backend is a layer stack of dielectrics housing multiple metal lines and connections used to provide power and electrical signal routing within the Photonic Integrated Circuit (PIC), and may include interfacing with optical devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes providing a photonic wafer that includes an electrical layer and a layer disposed on a substrate. The layer includes at least one optical waveguide that is disposed between the electrical layer and the substrate. The method also includes removing a portion of the substrate underneath the optical waveguide and forming an end-face coupler. A portion of the end-face coupler is within the removed portion of the substrate. The end-face coupler transmits an optical signal to, or receives an optical signal from, an external optical device. Other embodiments include an apparatus formed using this method.

Example Embodiments

In conventional optical devices, one or more electrical layers are deposited in a complex sequence of processes. Implementing end-face couplers within the electrical layers without interfering with the operation of the electrical layers is challenging and involves complex processes that are costly and difficult to implement. Additionally, metal lines interfere strongly with light propagation. As such, areas used for end-face coupling cannot be used for electrical connectivity.

This disclosure describes a photonic wafer that includes an end-face coupler beneath a photonic layer of the wafer. A portion of a substrate or buried oxide layer beneath the photonic layer may be removed. The end-face coupler may then be formed within the removed portion such that the end-face coupler directs light into a waveguide in the photonic layer, e.g. by evanescent coupling. A cladding may then be deposited to fill the remainder of the removed portion. In this manner, the end-face coupler is formed beneath the photonic layer. In this approach, standard processes to create an electrical layer above the photonic layer can be applied. In some embodiments, vertical electrical connections connecting the electrical layers above the photonic layer and the wafer underside may be formed outside the removed portion. So called vias may be formed through the substrate, buried oxide layer, and the photonic layer and to an electrical layer of the wafer.

Figure 1:
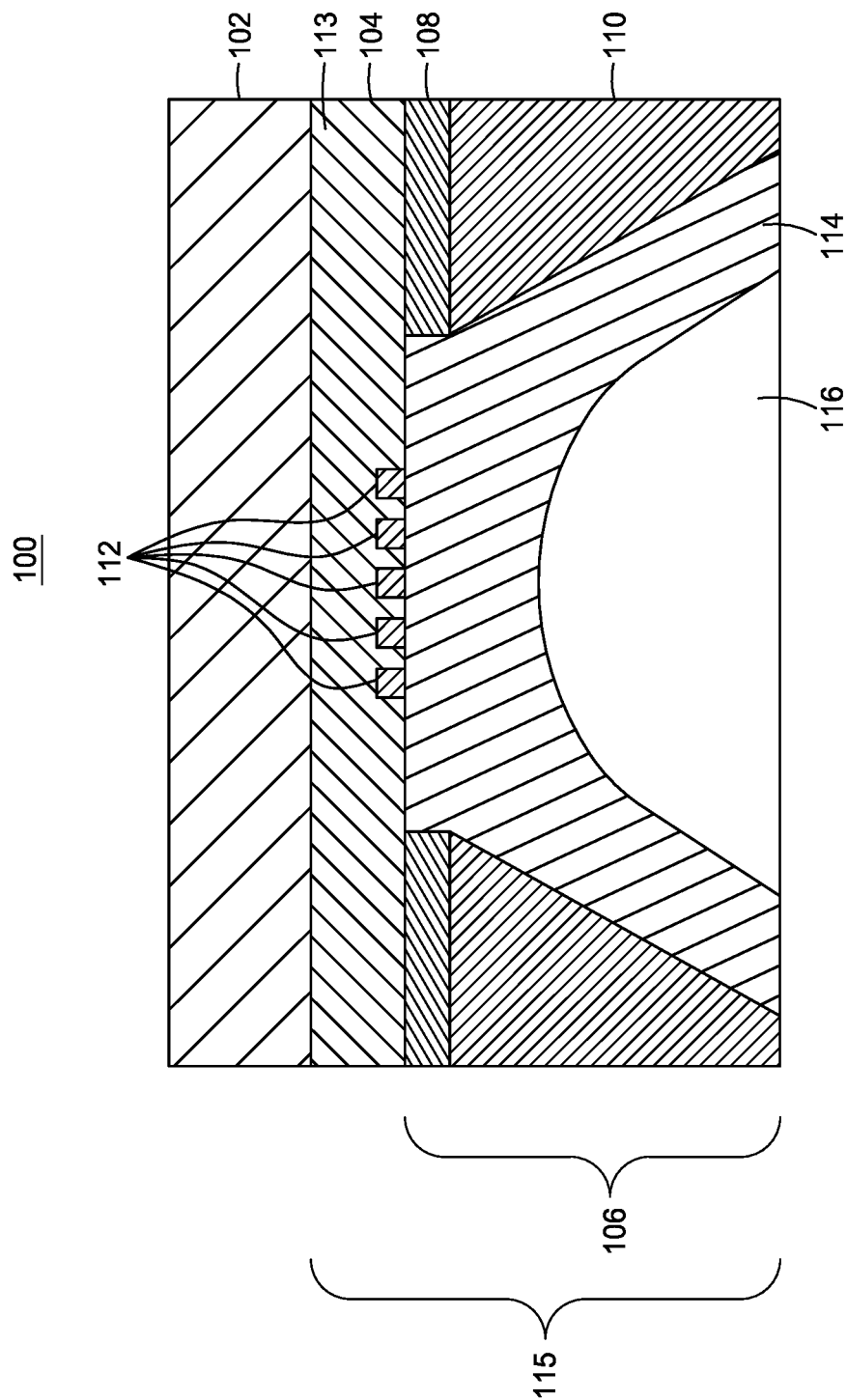
FIG. 1 illustrates an example photonic wafer according to an embodiment.

FIG. 1 illustrates an example photonic wafer 100. The photonic wafer 100 includes an electrical layer (or layers) 102, a layer 104, and a substrate 106. The electric layer 102 is disposed on the layer 104, and the layer 104 is disposed on the substrate 106. The layer 104 includes one or more waveguides 112 and a cladding 113. The substrate 106 includes a buried oxide layer 108 and a semiconductor layer 110. The photonic wafer 100 includes an expansion layer 114 formed beneath the layer 104. The expansion layer 114 may have a refractive index higher than the cladding 113 and the buried oxide layer 108, but lower than the material of the waveguides 112. In such embodiments, the expansion layer 114 provides space to enlarge the beam diameter of the optical signal carried in the waveguides 112 downwards, improving coupling efficiency to an external optical source without introducing light into the electrical layer 102.

The electrical layer 102 may be a top layer of the photonic wafer 100 and may include active electrical components, metallization, and routing on multiple sub-layers with the electrical layer 102. Due to the composition and function of the electrical layer 102, it may be beneficial to minimize or eliminate components from other layers of the photonic wafer 100 from being positioned or located within the electrical layer 102, or being co-planar with the electrical layer 102, so as to not complicate the fabrication of the electrical layer 102, in particular embodiments.

The layer 104 is positioned beneath the electrical layer 102, and disposed on the substrate 106. The layer 104 may receive and route optical signals to other portions of the photonic wafer 100. As seen in FIG. 1, the layer 104 includes one or more optical waveguides 112 that receive and route optical signals through the layer 104. The layer 104 also includes a cladding 113 disposed around the waveguides 112. In certain embodiments, the layer 104 includes one or more additional optical elements within the cladding 113. These optical elements may be positioned above the waveguides 112 and improve the end-face coupling of the photonic wafer 100. For example, there may be several dielectric layers on top of the waveguides 112. These dielectric layers may facilitate lithography and etching. As another example, there may be protective layers (e.g. to cover Germanium, which degrades when exposed to oxygen). The protective layers could be used to create additional optical structures. In certain embodiments, such layers could be used to fine-tune how light is guided in the waveguides 112, to adjust the evanescent coupling between waveguides 112 and an end-face coupler, or to further isolate the waveguides 112 or the end-face coupler from the electrical layer 102.

The substrate 106 may include a buried oxide layer 108 and a semiconductor layer 110. The buried oxide layer 108 may be positioned beneath the layer 104 and disposed on the semiconductor layer 110. The semiconductor layer 110 may be formed using any semiconductor material, such as silicon, germanium, or other compound semiconductors (e.g., gallium arsenide, gallium nitride, or indium phosphide). In certain embodiments, the semiconductor layer 110 may have a thickness that is less than or equal to 100 microns.

As seen in FIG. 1, an expansion layer 114 is formed within the substrate 106 beneath the layer 104 of the photonic wafer 100. The expansion layer 114 extends laterally to the semiconductor layer 110. Additionally, the expansion layer 114 extends vertically to the bottom of the photonic wafer 100. The waveguides 112, the cladding 113, and the expansion layer 114 form a combined optical system 115 with a large beam diameter, in certain embodiments. This system 115 forms an end-face coupler and provides an optical interface at an end of the photonic wafer 100 for end-face coupling to an external optical device (e.g., an optical fiber or a laser). The system 115 receives an optical signal from the optical device at an end-face of the photonic wafer 100. The optical signal is then directed towards one or more waveguides 112 in the layer 104, e.g. by changing the cross section of the waveguides along the axis of the light propagation. Additionally or alternatively, the combined optical system may receive an optical signal from the waveguide 112 and direct that optical signal towards the end-face of the photonic wafer 100 and towards the external optical device.

Also as seen in FIG. 1, a cladding 116 is also formed in the substrate 106. The cladding 116 is formed beneath the expansion layer 114. Generally, the cladding 116 has a lower index than the expansion layer 114, and the expansion layer 114 has a lower index than the waveguides 112. For example, the expansion layer 114 may have an index of approximately 1.5, while the cladding 116 has an index of 1.46. Materials may include silicon oxynitride or polymers. In this manner, optical signals entering the expansion layer 114 are directed towards the one or more waveguides 112.

The expansion layer 114 may be formed in the buried oxide layer 108 and the semiconductor layer 110. As seen in FIG. 1, the portion of the expansion layer 114 in the buried oxide layer 108 may have a shorter width than the portion of the expansion layer 114 in the semiconductor layer 110. For example, the portion of the expansion layer 114 in the buried oxide layer 108 may have a width of 20 microns or greater. Because the width of the portion of the expansion layer 114 in the semiconductor layer 110 is greater than the width of the portion of the expansion layer 114 in the buried oxide layer 108, portions of the buried oxide layer 108 and the semiconductor layer 110 may be disposed between portions of the expansion layer 114 and the layer 104 (e.g., the cladding 113 of the layer 104). Moreover, the expansion layer 114 may have any suitable thickness. For example, a distance between a waveguide 112 and the cladding 116 through the expansion layer 114 may be approximately 10 microns. In some embodiments, the expansion layer 114 has vertical walls rather than slated walls. In these embodiments, no portion of the buried oxide layer 108 or the semiconductor layer 110 is disposed between portions of the expansion layer 114 and the layer 104.

In the example of FIG. 1, the profile of an optical signal in the layer 104 is changed (e.g., enlarged) for improved efficiency for end-face coupling. If desired, the optical signal can be concentrated into the layer 104 by changing the geometry of the waveguides 112. Thus, the cladding 113, the waveguides 112, the expansion layer 114, and the cladding 116 form the system 115 that forms an end-face coupler.

In certain embodiments, the end-face coupler changes the mode size of an optical signal carried in waveguides 112 by expanding it into the expansion layer 114. For example, while propagating in the waveguide 112 alone (which may have dimensions that are less than 1 micron), the mode size may be approximately 1 micron in diameter or less. However, in conjunction with expansion layer 114, this mode size can be adiabatically increased to better match the mode size of an external optical device (e.g., 6-15 microns). Doing so improves the efficiency of the optical coupling between the photonic wafer 100 and the external optical device, especially when the optical signal is confined in a single mode.

Figure 2:
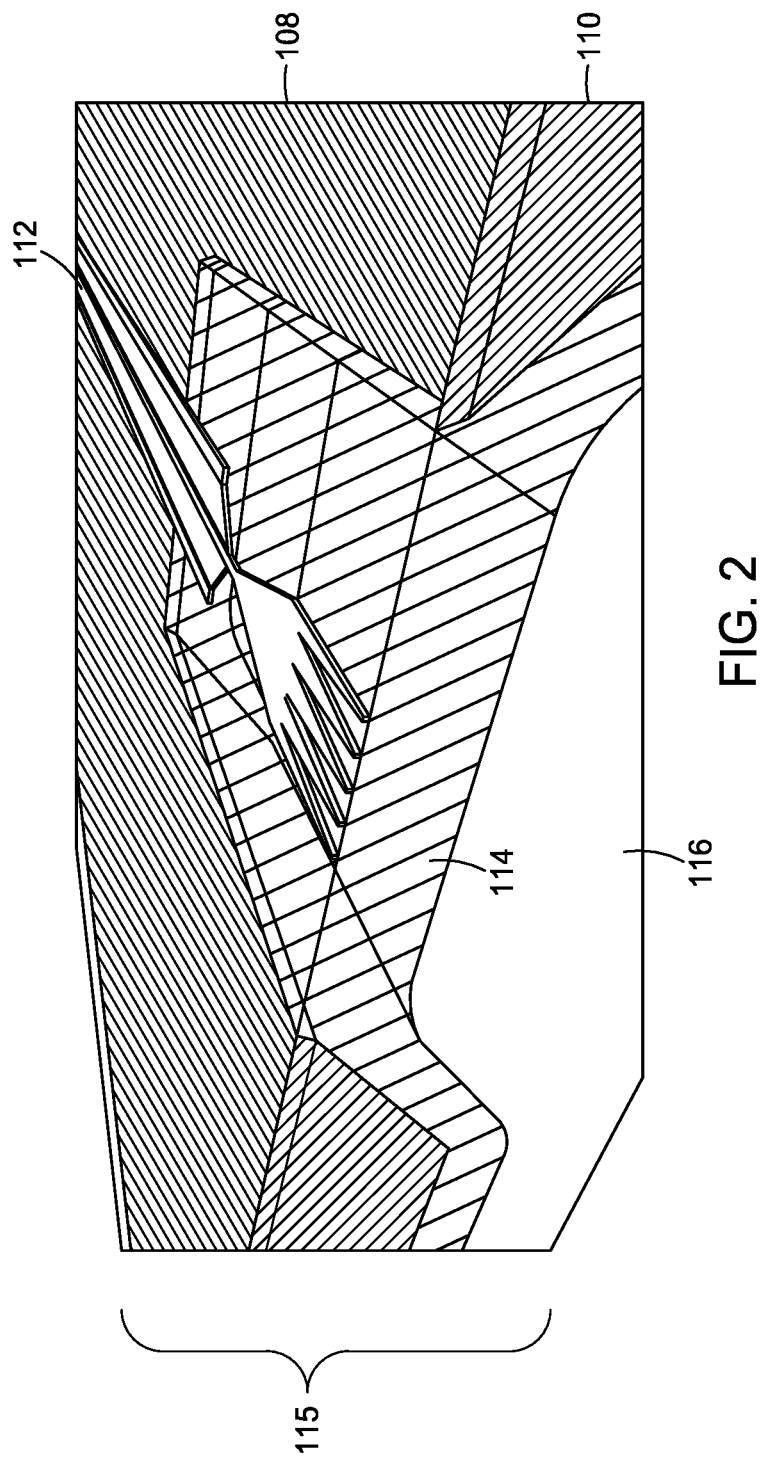
FIG. 2 illustrates a three-dimensional view of the photonic wafer of FIG. 1.

FIG. 2 illustrates an isometric view of portions of the photonic wafer 100 of FIG. 1. As seen in FIG. 2, the photonic wafer 100 includes a waveguide 112. The waveguide 112 is disposed on a buried oxide layer 108. The buried oxide layer 108 is disposed on a semiconductor layer 110. An expansion layer 114 is formed in the buried oxide layer 108 and the semiconductor layer 110. The expansion layer 114 is formed beneath the waveguide 112. The end-face coupler structure comprised of waveguides 112, cladding 113, and expansion layer 114 may receive optical signals. The increase of the waveguide cross section further internal to the wafer edge may direct such signals towards the waveguide 112. The waveguide 112 may receive the optical signals and direct the optical signals towards other sections of the photonic wafer 100. A cladding 116 is formed in the semiconductor layer 110 underneath the expansion layer 114. As discussed previously, the material used to form the cladding 116 may have a lower index than the material used to form the expansion layer 114. As a result, optical signals in the system 115 that forms the end face coupler can be directed towards the waveguide 112. As seen in FIG. 2, the geometry of the waveguide 112 may vary to concentrate an optical signal in the layer 104. For example, the width of the waveguide 112 may change or vary the concentration of the optical signal.

Figure 3:
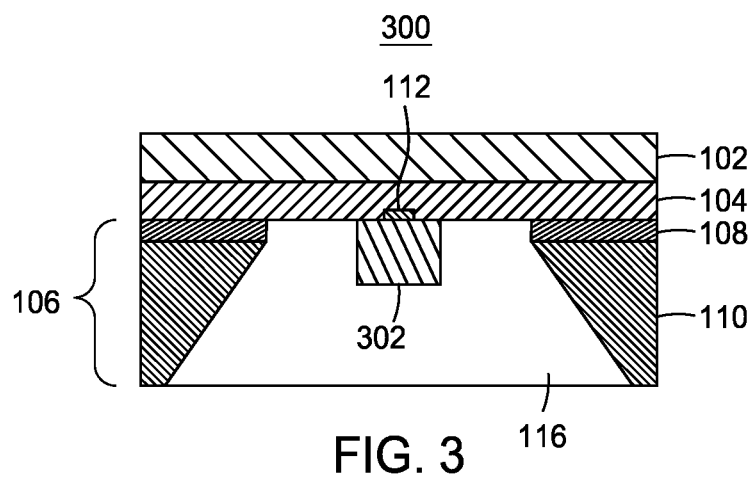
FIG. 3 illustrates an example photonic wafer according to an embodiment.

FIG. 3 illustrates an example photonic wafer 300. As seen in FIG. 3, the photonic wafer 300 includes an electrical layer 102, a layer 104, and a substrate 106. As with the photonic wafer 100 of FIG. 1, the electrical layer 102 is disposed on the layer 104 and the layer 104 is disposed on the substrate 106. The substrate 106 includes a buried oxide layer 108 and a semiconductor layer 110. The buried oxide layer 108 is disposed on the semiconductor layer 110.

A difference between photonic wafer 300 and the photonic wafer 100 of FIG. 1 is that the photonic wafer 300 includes an end-face coupler 302 that is patterned and etched into a cuboid shape. After receiving an optical signal from an external optical source, the end-face coupler 302 couples (e.g., evanescently couples) the signal to the waveguide 112 in the layer 104, in certain embodiments. The end-face coupler 302 occupies a portion of the buried oxide layer 108 and the semiconductor layer 110. The end-face coupler 302 in the photonic wafer 300 may be patterned and etched such that the end-face coupler 302 does not extend laterally to the semiconductor layer 110 or vertically to the bottom of the photonic wafer 300. In this manner, and as seen in FIG. 3, no portions of the buried oxide layer 108 and the semiconductor layer 110 are positioned between the end-face coupler 302 and the layer 104 (although some of cladding 116 may still be positioned between the end-face coupler 302 and the layer 104). The end-face coupler 302 may have a width that is of the same order as the mode size for coupling to an external optical device. For example, the end-face coupler 302 may have a height and width that is approximately ten microns to couple to optical fibers. Additionally, the layer 104 may include one or more additional optical components positioned above the waveguide 112. These optical components may improve the performance of the end-face coupler 302.

Because the end-face coupler 302 has been patterned and etched, the cladding 116 occupies more space than the cladding 116 in the photonic wafer 100 of FIG. 1. The cladding 116 may be deposited after the end-face coupler 302 has been patterned and etched. In this manner, the cladding 116 occupies space to the sides of the end-face coupler 302 and below the end-face coupler 302. The end-face coupler 302 may be formed using material with a higher index than the cladding 116. In this manner, an optical signal entering the end-face coupler 302 can be guided in the end-face coupler 302 and later directed to the waveguide 112.

Furthermore, in one embodiment, the end-face coupler 302 extends to a face of the photonic wafer 300. For example, if FIG. 3 shows a front face view of the photonic wafer 300, then end-face coupler 302 extends to the front face of the photonic wafer 300. As with the photonic wafer 100 of FIG. 1, the end-face coupler 302 provides an optical interface for end-face coupling to an optical fiber. In another embodiment, the end-face coupler 302 may be recessed a few microns from the optical interface and covered with a dielectric material and can still provide an optical interface for coupling to an optical fiber. That is, the end-face coupler 302 does not need to be exposed at the optical interface (e.g., a side of the photonic wafer 300) to optically couple to an external optical fiber.

The end-face coupler 302 may be formed by first removing portions of the substrate 106. For example, portions of the semiconductor layer 110 and the buried oxide layer 108 may be removed by etching. After these portions of the substrate 106 are removed, material for the end-face coupler 302 may be deposited into the removed portions of the substrate 106. For example, the material for the end-face coupler 302 may be spin coated into the removed portions of the substrate 106. The material for the end-face coupler 302 may then be patterned and etched such that the end-face coupler 302 is the desired shape (e.g., a cuboid shape). The material for the cladding 116 is then deposited into the remainder of the removed portions of the substrate 106. For example, the material for the cladding 116 may be spin coated into the remainder of the removed portions of the substrate 106. The cladding 116 may then be planarized to form a smooth bottom surface of the photonic wafer 300.

Figure 4:
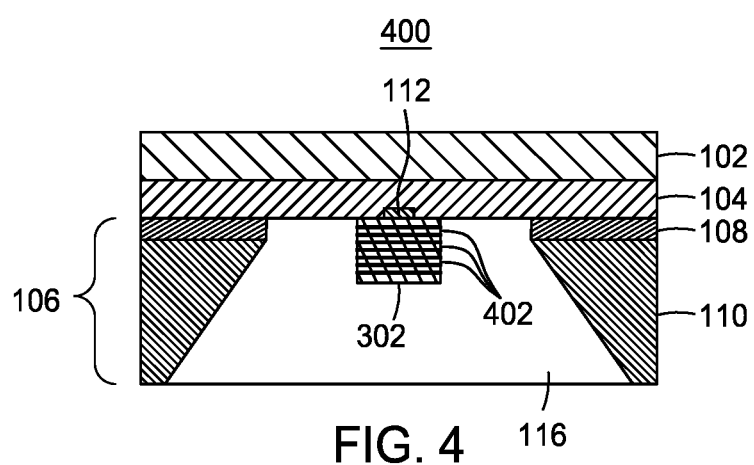
FIG. 4 illustrates an example photonic wafer according to an embodiment.

FIG. 4 illustrates an example photonic wafer 400. The photonic wafer 400 is similar to the photonic wafer 300 in FIG. 3 except the end-face coupler 302 in the photonic wafer 400 is formed using different materials. As seen in FIG. 4, the end-face coupler 302 includes multiple layers 402 that are optically thin (e.g., their thickness is smaller than the wavelength of the optical signal). In one embodiment, each layer 402 is formed using a different material than its directly adjacent layers 402. The end-face coupler 302 may include any number of layers 402. The layers 402 may be formed using any suitable materials, such as silicon dioxide or silicon nitride. Building a layer stack of the required thickness out of thin layers 402 is more easily achievable with thin film technology as it allows to balance internal mechanical stress in the layer stack and to finely adjust the refractive index in the stack.

The end-face coupler 302 in the photonic wafer 400 may be formed using a similar process for forming the end-face coupler 302 in the photonic wafer 300 of FIG. 3. For example, portions of the substrate 106 may first be removed through etching. Then a material for a top layer 402 of the end-face coupler 302 may be deposited (e.g., by plasma deposition) into the removed portions of the substrate 106. The thickness of the deposited material may be approximate to the thickness of the top layer 402. After the material is deposited, another material of a second layer 402 of the end-face coupler 302 may be deposited onto the first material. This process may repeat until the different materials of the different layers 402 have been deposited into the removed portions of the substrate 106. After the different materials are deposited, the different layers of materials may be patterned and etched to form the end-face coupler 302. Alternatively, the layers could be patterned individual after their respective deposition step. The cladding 116 may then be deposited into the remainder of the removed portions of the substrate 106. In this manner, the end-face coupler 302 may be created with multiple layers 402 of different materials. Additionally, the layer 104 may include one or more additional optical components positioned above the waveguide 112. These optical components may improve the performance of the end-face coupler 302.

Figure 5:
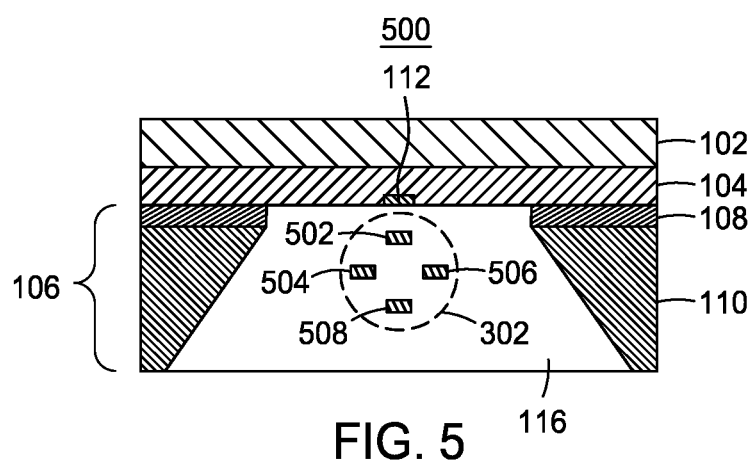
FIG. 5 illustrates an example photonic wafer according to an embodiment.

FIG. 5 illustrates an example photonic wafer 500. The photonic wafer 500 is the same as photonic wafers 300 and 400 of FIGS. 3 and 4 except the photonic wafer 500 includes an end-face coupler 302 that includes a waveguide array with multiple waveguides. The array may receive optical signals from an external optical source and later direct them towards the waveguide 112 in the layer 104. As seen in FIG. 5, the end-face coupler 302 includes waveguides 502, 504, 506, and 508. Each of these waveguides 502, 504, 506, and 508 may be formed using the same or different materials. The end-face coupler 302 may include any number of waveguides.

To form the end-face coupler 302 of the photonic wafer 500, portions of the substrate 106 may first be removed. Parts of the buried oxide layer 108 may remain underneath the waveguides 112. In certain embodiments, a first part of cladding 116 is deposited into the removed portion of the substrate 106 up to the start position of the first waveguide. Then, the material for the first waveguide would be deposited in the desired thickness. A remaining portion of the substrate 106 or the first part of the cladding 116 may separate the first waveguide from the waveguide 112. After the material for the first waveguide is deposited, the material may be patterned to form the first waveguide. Then, material for the cladding 116 may be deposited into the removed portion of the substrate 106 to cover the first waveguide. Material for a second waveguide (e.g., waveguide 504) may then be deposited into the removed portion of the substrate 106. After the material for the second waveguide is deposited, the material may be patterned to form the second waveguide and then additional material for the cladding 116 may be deposited into the removed portion of the substrate 106 to cover the second waveguide. This process may repeat until a desired number of waveguides have been formed in the photonic wafer 500. Any number of waveguides may be formed in each repeat of the process. In this manner, each waveguide forms a separate prong of the end-face coupler 302 in the photonic wafer 500. Additionally, the layer 104 may include one or more additional optical components positioned above the waveguide 112. These optical components may improve the performance of the end-face coupler 302.

Figure 6A:
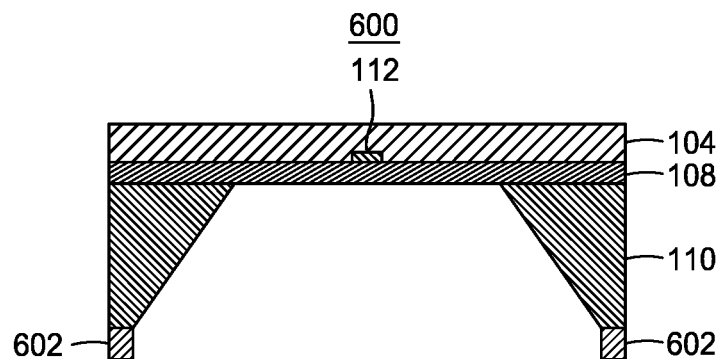
FIGS. 6A, 6B, 6C, 6D, 6E, 6F, and 6G illustrate an example process flow.

FIGS. 6A through 6G show an example process flow for forming an end-face coupler 302 in a photonic wafer. FIG. 6A shows the photonic wafer 600 after a first step of etching a semiconductor layer 110 is complete. As seen in FIG. 6A, a portion of the semiconductor layer 110 in the photonic wafer 600 has been removed through etching. A photoresist 602 may be positioned beneath the semiconductor layer 110 to control the etching process. As seen in FIG. 6A, portions of the photoresist 602 remain after the etching.

Figure 6B:
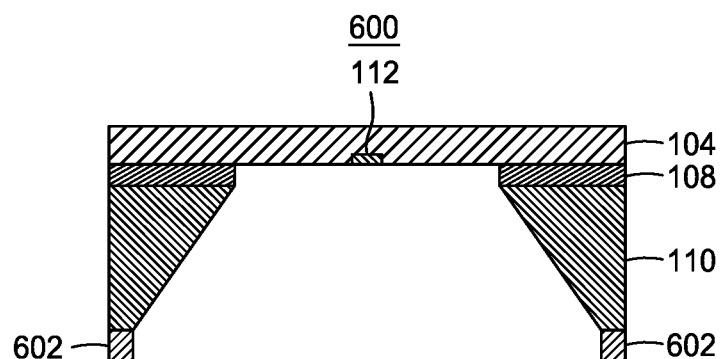

FIG. 6B shows the photonic wafer 600 after a second step of etching the buried oxide layer 108 is complete. As seen in FIG. 6B, a portion of the buried oxide layer 108 has been removed through etching. The width of the removed portion of the buried oxide layer 108 may have a shorter width than the width of the removed portion of the semiconductor layer 110. In certain embodiments, etching the buried oxide layer 108 exposes the waveguide 112 in the layer 104.

Figure 6C:
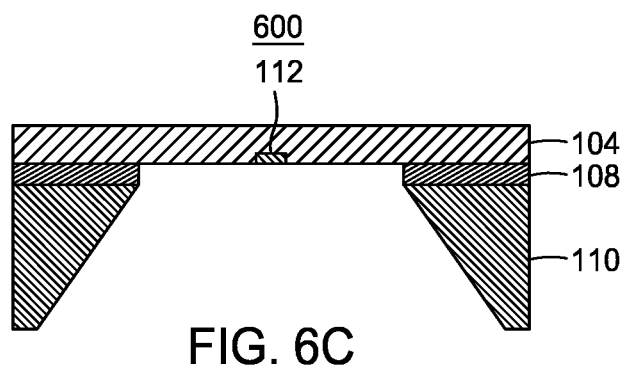

FIG. 6C shows the photonic wafer 600 after a third step of removing the photoresist 602 has been completed. As seen in FIG. 6C, the photoresist 602 has been removed from the bottom of the semiconductor layer 110.

Figure 6D:
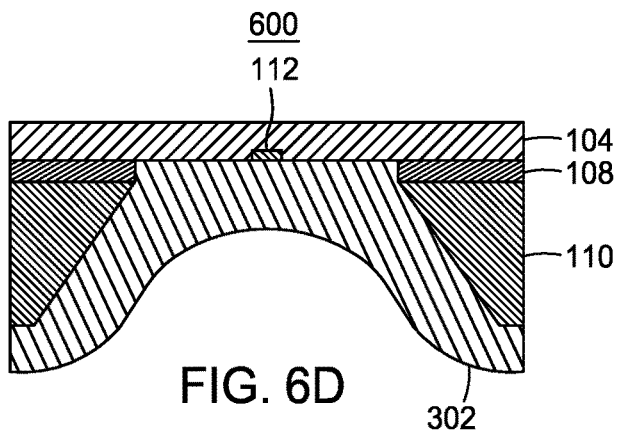

FIG. 6D shows the photonic wafer 600 after material for the end-face coupler 302 has been deposited in the removed portions of the buried oxide layer 108 and the semiconductor layer 110. As discussed previously, the material for the end-face coupler 302 may be spin coated into the removed portions of the buried oxide layer 108 and the semiconductor layer 110. As seen in FIG. 6D, the material for the end-face coupler 302 may extend laterally to the buried oxide layer 108 and the semiconductor layer 110. Additionally, the material for the end-face coupler 302 may extend vertically to beneath the semiconductor layer 110.

Figure 6E:
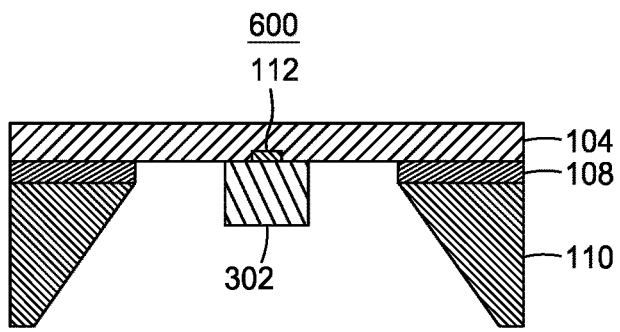

FIG. 6E shows the photonic wafer 600 after a fifth step of patterning and etching the end-face coupler 302 has been completed. As seen in FIG. 6E, the material for the end-face coupler 302 has been patterned and etched into a cuboid shape. In this manner, the end-face coupler 302 no longer extends laterally to the buried oxide layer 108 and the semiconductor layer 110. Additionally, the end-face coupler 302 no longer extends vertically to beneath the semiconductor layer 110.

Figure 6F:
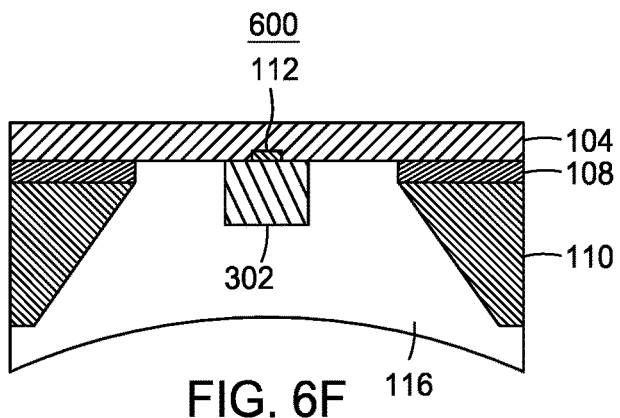

FIG. 6F shows the photonic wafer 600 after a sixth step of depositing material for the cladding 116 has been completed. As seen in FIG. 6F, the material for the cladding 116 has been deposited into the remainder of the removed portions of the buried oxide layer 108 and the semiconductor layer 110. The cladding 116 extends laterally to the buried oxide layer 108 and the semiconductor layer 110. Additionally, the cladding 116 extends vertically to below the semiconductor layer 110.

Figure 6G:
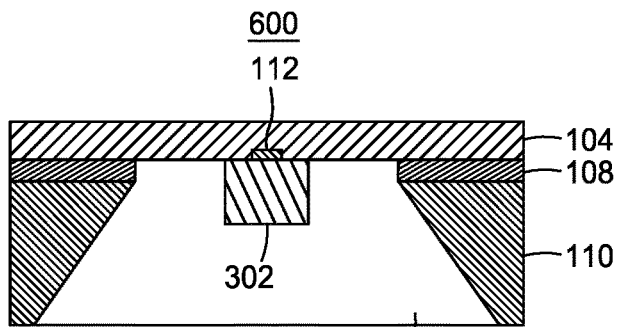

FIG. 6G shows the photonic wafer 600 after a seventh step of planarization of the cladding 116 is complete. As seen in FIG. 6G, the cladding 116 has been planarized such that the cladding 116 is level with the bottom of the semiconductor layer 110. As a result, the bottom of the photonic wafer 600 is planarized.

The process flow shown in FIG. 6A through 6G may generally be followed with some modifications to form any of the photonic wafers 100, 300, 400, and 500 shown in FIGS. 1, 3, 4, and 5. For example, to form the photonic wafer 100 in FIG. 1, the cladding 116 may be deposited into the remainder of the removed portions of the buried oxide layer 108 or the semiconductor layer 110 after the step shown in FIG. 6D. In this manner, the cladding 116 occupies the remaining space underneath the end-face coupler 302. The steps shown in FIGS. 6E and 6F may then be skipped.

As another example, to form the photonic wafer 400 shown in FIG. 4, the materials for the end-face coupler 302 may be deposited (e.g., by plasma deposition rather than spin coating as shown in FIG. 6D). Then, materials for additional layers 402 of the end-face coupler 302 may be deposited after the step shown in FIG. 6D. In this manner, the additional material is deposited onto the first material deposited for the end-face coupler 302. After the materials for the different layers 402 are deposited, the end-face coupler 302 may be patterned and etched as shown in FIG. 6E. The resulting end-face coupler 302 may have multiple layers 402 made of different materials.

As another example, to form the photonic wafer 500 shown in FIG. 5, the deposition steps shown in FIGS. 6D, 6E, and 6F may be performed and repeated in different orders. For example, the material for the waveguides in the end-face coupler 302 may be deposited in a more restrained manner that in FIG. 6D such that the resulting waveguides are more confined in space. Moreover, material for the cladding 116 may be deposited after material for each waveguide in the end-face coupler 302 has been deposited. In this manner, deposition of material for a waveguide is alternated with deposition of material for the cladding 116.

Figure 7:
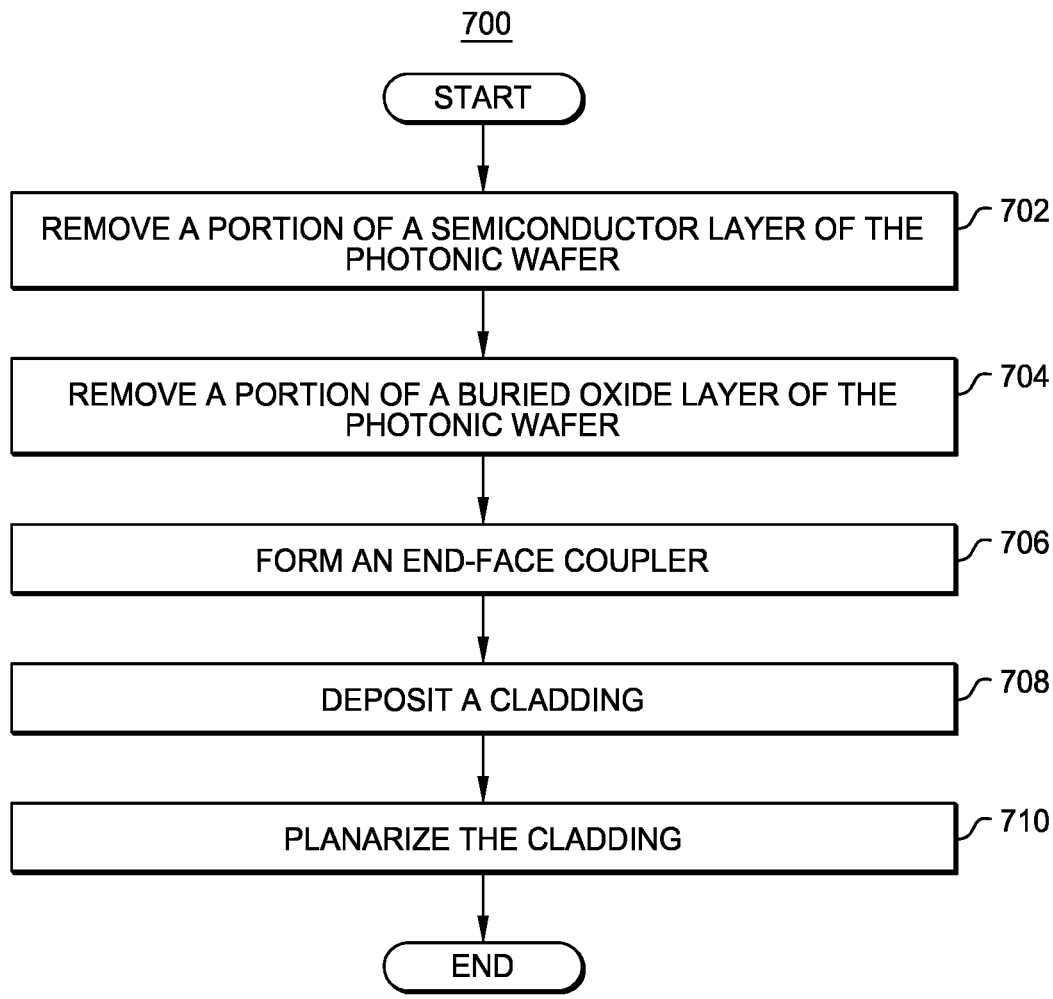
FIG. 7 is a flowchart of an example method for forming a photonic wafer.

FIG. 7 is a flowchart of an example method 700 for forming an optical device that includes a photonic wafer, such as the photonic wafers 100, 300, 400, or 500 shown in FIG. 1, 3, 4, or 5. A machine operator or device creator may perform the method 700. In particular embodiments, by performing method 700, an end-face coupler may be formed beneath a layer 104 of a photonic wafer, which reduces or eliminates interference by the end-face coupler in an electrical layer 102 of the photonic wafer.

In block 702, the operator removes a portion of a semiconductor layer 110 of the photonic wafer. The operator may use an etching process to remove portions of the semiconductor layer 110. By removing portions of the semiconductor layer 110, the operator may expose portions of the buried oxide layer 108.

In block 704, the operator removes a portion of the buried oxide layer 108. The operator may use an etching process to remove the portion of the buried oxide layer 108. In particular embodiments, the width of the removed portion of the buried oxide layer 108 may be shorter than the width of the removed portion of the semiconductor layer 110. In certain embodiments, by removing the portion of the buried oxide layer 108, the operator may expose a waveguide 112 of the layer 104.

In block 706, the operator forms an end-face coupler. All or a portion of the end-face coupler may be positioned in the removed portion of the buried oxide layer 108 or the semiconductor layer 110. For example, the operator may deposit a material for the end-face coupler into the removed portion of the buried oxide layer 108 or the semiconductor layer 110. The operator may spin coat the material for the end-face coupler into the removed portion of the buried oxide layer 108 or the semiconductor layer 110 or use other suitable techniques for depositing of optical materials. In some embodiments, the operator may form different compositions as well as shapes and a variety of sub-structures for the end-face coupler. For example, the operator may deposit materials for additional layers of the end-face coupler after depositing the first material for the end-face coupler. As another example, the operator may pattern and etch the end-face coupler to change the size and shape of the end-face coupler. As yet another example, the operator may alternate depositing materials for waveguides of the end-face coupler and materials for the cladding 116 to create an end-face coupler that includes a waveguide array.

In block 708, the operator deposits a cladding 116 into the remainder of the removed portion of the buried oxide layer 108 or the semiconductor layer 110. The operator may spin coat the material for the cladding 116 into the removed portion of the buried oxide layer 108 or the semiconductor layer 110 or use other deposition techniques. The material for the cladding 116 may have a lower index than the material for the end-face coupler. In block 710, the operator planarizes the cladding 116 such that the cladding 116 is level with a bottom surface of the photonic wafer.

Figure 8:
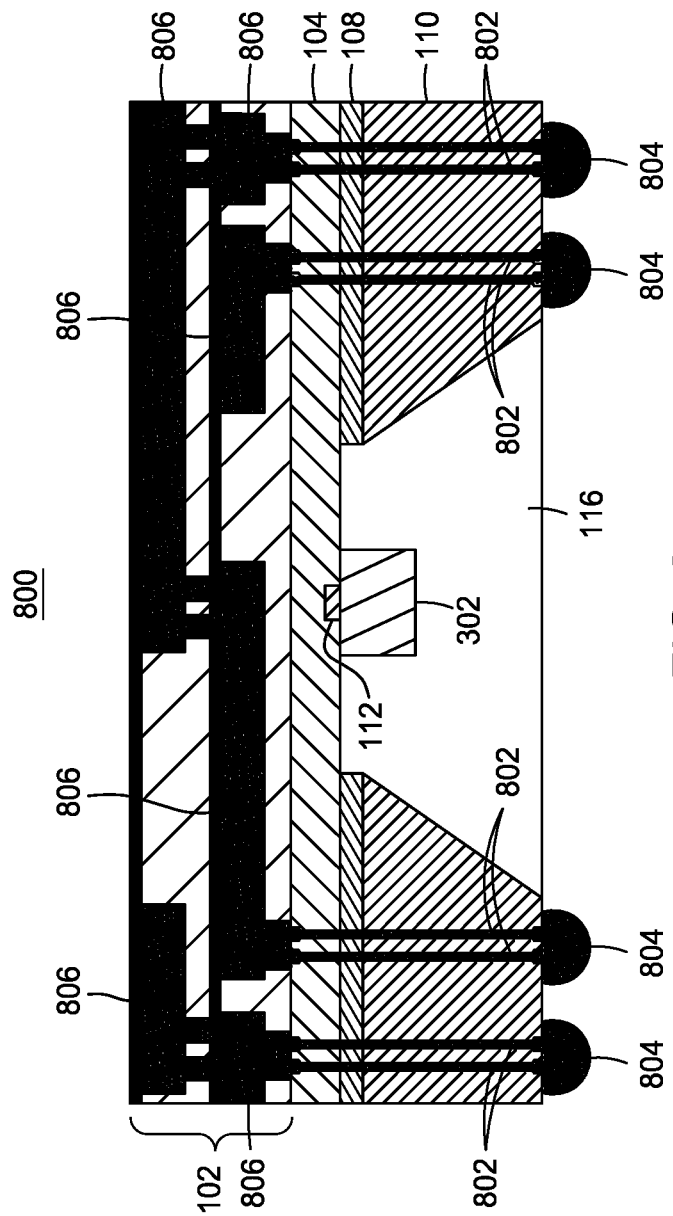
FIG. 8 illustrates an example device.

FIG. 8 illustrates a device 800. As seen in FIG. 8, the device 800 includes several layers including an electrical layer 102, a layer 104, a buried oxide layer 108, and a semiconductor layer 110. The device 800 also includes an end-face coupler 302 formed beneath the layer 104. As seen in FIG. 8, the processes described using the previous Figures to form an end-face coupler within the substrate and beneath the layer 104 are compatible with and synergize with processes for forming vias. For example, certain processes used to form vias (e.g., accessing the wafer underside and wafer thinning) simplify the forming of the end-face coupler.

Vias 802 have been formed through the semiconductor layer 110, the buried oxide layer 108, and the layer 104 to the electrical layer 102. The vias 802 provide channels through which electrical signals may be communicated between the bottom of the device 800 and the electrical layer 102. The vias 802 may attach to points 804 at the bottom of the device 800. The points 804 may be solder beads or solder points to which electrical connections may be made. For example, the device 800 may be attached to a circuit by soldering the points 804. Also as seen in FIG. 8, the vias 802 connect to one or more metallization layers 806 in the electrical layer 102. The metallization layers conduct electrical signals to other portions of the electrical layer 102. As a result, the vias 802 allow electrical signals to be communicated between the electrical layer 102 and the points 804.

Figure 9:
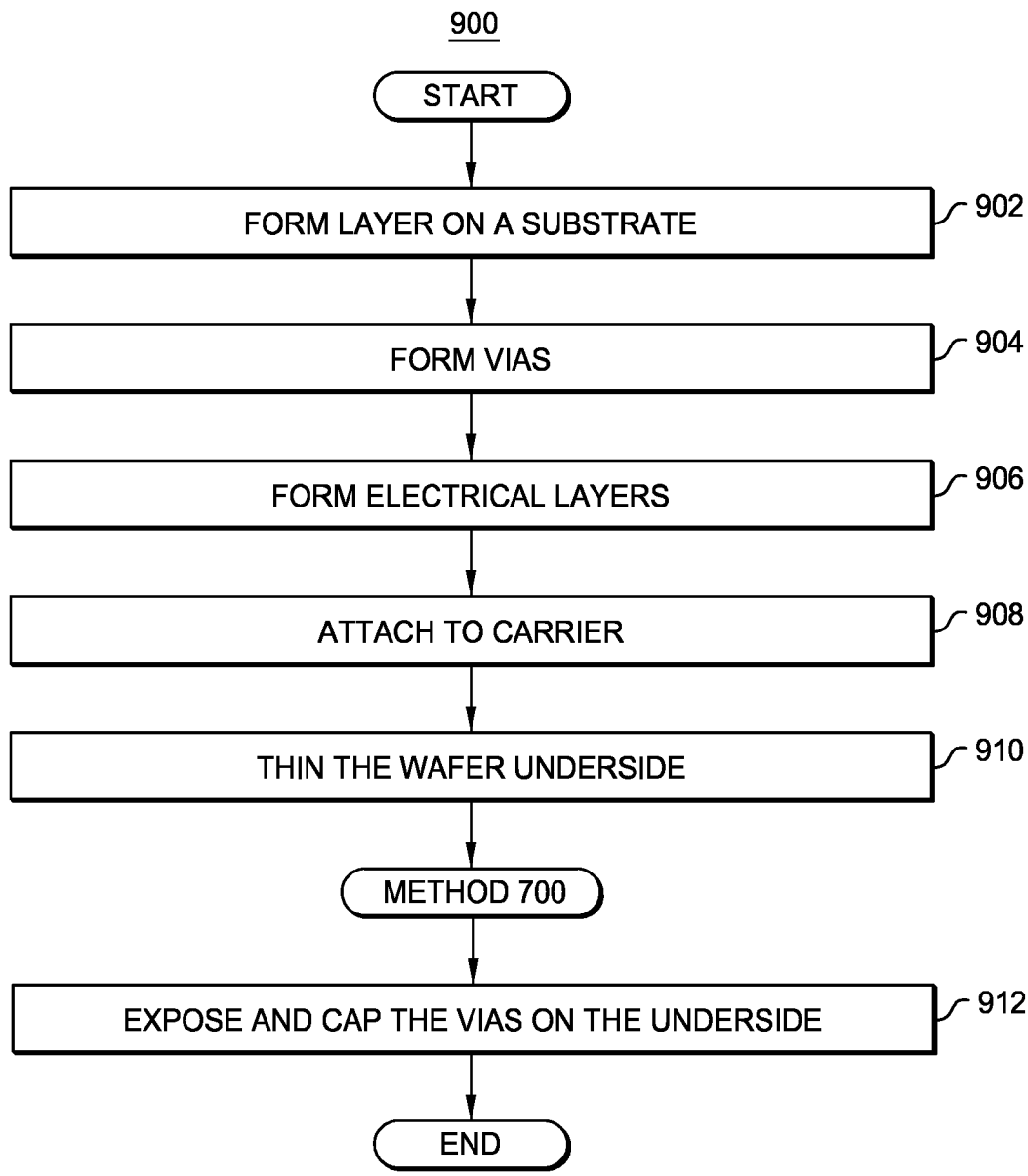
FIG. 9 is a flowchart of an example method for forming a photonic device.

FIG. 9 is a flowchart of an example method of forming a photonic device, such as the device 800. A machine operator or device creator may perform the method 900. In particular embodiments, by performing method 900, an end-face coupler may be formed beneath a layer 104 of a photonic wafer, which allows to use standard processes to create an electrical layer 102 of the photonic wafer.

In block 902, a layer 104 is formed on a substrate 106. The layer 104 may include a waveguide 112 disposed within a cladding 113. The substrate 106 may include a buried oxide layer 108 disposed on a semiconductor layer 110. In block 904, vias 802 are formed through the layer 104 and the substrate 106. For example, the vias 802 may be formed using deep-etching and a metal fill. The vias 802 provide a channel through which electric signals may be communicated. In block 906, one or more electrical layer 102 are formed on the layer 104. The electrical layers 102 may include metallization layers 806 that connect to the vias 802.

In block 908, a carrier is attached to the wafer resulting from block 906. The carrier may be a material that couples to a top layer of the wafer to allow the wafer to be handled or carried. In block 910, the wafer underside is thinned. The blocks of the method 700 are then performed to form an end-face coupler 302 in the wafer. Then, in block 912, the vias 802 are exposed and capped on the underside of the waver. In some embodiments, the vias 802 are exposed in block 710 of the method 700 during planarization.

In summary, this disclosure describes the formation of an optical device that can be end-face coupled to an optical fiber. The optical device includes an end-face coupler formed beneath a photonic layer and waveguide of the optical device. The end-face coupler receives optical signals through a face of the optical device and directs the optical signal towards the waveguide. Because the end-face coupler is formed beneath the photonic layer, standard processed can be used to create an electrical layer above the photonic layer, in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An apparatus, comprising:
a photonic wafer comprising an electrical layer and a layer disposed on a substrate, wherein the layer comprises at least one optical waveguide that is disposed between the electrical layer and the substrate; and an end-face coupler, wherein a portion of the end-face coupler is within a portion of the substrate underneath the at least one optical waveguide, and wherein the end-face coupler is configured to direct an optical signal to or from the optical waveguide and comprises an optical interface for end-face coupling.

2. The apparatus of claim 1, further comprising through vias through the substrate, through the layer, and to the electrical layer.

3. The apparatus of claim 1, further comprising a cladding disposed around the end-face coupler, wherein the end-face coupler comprises a first material that has a higher index of refraction than the cladding.

4. The apparatus of claim 3, wherein the end-face coupler further comprises a stack on the first material, the stack comprising a plurality of different materials.

5. The apparatus of claim 3, wherein the end-face coupler further comprises:

a first prong in the cladding, the first prong comprising a second material; and a second prong formed by the first material.

6. A method, comprising:

providing a photonic wafer comprising at least one optical waveguide disposed on a substrate;

removing a portion of the substrate underneath the at least one optical waveguide;

depositing a material in the removed portion of the substrate; and patterning and etching the material to form an end-face coupler configured to transmit an optical signal from an external optical device to the at least one optical waveguide.

7. The method of claim 6, further comprising forming a through via through the substrate.

8. The method of claim 6, further comprising depositing a cladding over the end-face coupler, wherein the material has a higher index of refraction than the cladding.

* * * * *